(12) United States Patent
Yamazaki (10) Patent No.: US 12,275,134 B2
(45) Date of Patent: Apr. 15, 2025

(54) ROBOT SYSTEM

(71) Applicant: FANUC CORPORATION, Yamanashi (JP)

(72) Inventor: Takashi Yamazaki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 344 days.

(21) Appl. No.: 17/758,832

(22) PCT Filed: Feb. 8, 2021

(86) PCT No.: PCT/JP2021/004534
§ 371 (c)(1),
(2) Date: Jul. 14, 2022

(87) PCT Pub. No.: WO2021/161950
PCT Pub. Date: Aug. 19, 2021

(65) Prior Publication Data
US 2022/0388179 A1    Dec. 8, 2022

(30) Foreign Application Priority Data
Feb. 12, 2020   (JP) ................................. 2020-021733

(51) Int. Cl.
*B25J 13/08*    (2006.01)
*B25J 9/16*     (2006.01)

(52) U.S. Cl.
CPC .......... *B25J 13/089* (2013.01); *B25J 9/1676* (2013.01)

(58) Field of Classification Search
CPC ...... B25J 13/089; B25J 9/1676; B25J 9/1666; B25J 19/023; G05B 2219/40613
See application file for complete search history.

(56) References Cited

U.S. PATENT DOCUMENTS

| 10,373,336 | B1 * | 8/2019 | Islam ................... B25J 9/1697 |
| 2016/0059419 | A1 * | 3/2016 | Suzuki ................. B25J 9/1692 |
| | | | 901/14 |

(Continued)

FOREIGN PATENT DOCUMENTS

| CN | 109901589 A | 6/2019 |
| EP | 2705935 A1 | 3/2014 |

(Continued)

OTHER PUBLICATIONS

International Search Report issued in PCT/JP2021/004534; mailed Apr. 6, 2021.

*Primary Examiner* — Mohammad Ali
*Assistant Examiner* — Dhruvkumar Patel
(74) *Attorney, Agent, or Firm* — Studebaker Brackett PLLC (57) ABSTRACT

To provide a robot system that can easily generate a complete 3D point group for a measurement object. A robot system including: a robot including an arm; a 3D sensor provided to the arm; and a 3D point group generation unit for generating a 3D point group of a measurement object according to 3D data obtained by measurement of the measurement object with the 3D sensor, wherein the 3D point group generation unit generates the 3D point group of the measurement object by combining 3D data from measurement of the measurement object while repositioning the 3D sensor in response to the motion of the arm in any coordinate system in a working area of the robot.

2 Claims, 8 Drawing Sheets

(56) References Cited

U.S. PATENT DOCUMENTS

2019/0389065 A1* 12/2019 Horiguchi ............ G01B 21/047
2022/0032459 A1*  2/2022 Kojima ................. B25J 9/1666
2022/0097231 A1*  3/2022 Oyama ................. B25J 9/1666

FOREIGN PATENT DOCUMENTS

| JP | 2007-319938 A |   | 12/2007 | | |
|----|---------------|---|---------|---|---|
| JP | 2012-040669 A |   | 3/2012  | | |
| JP | 2012-076181 A |   | 4/2012  | | |
| JP | 2012066345 A  | * | 4/2012  | | |
| JP | 2013027953 A  | * | 2/2013  | ............ | B25J 9/1676 |
| KR | 10-2018-0064969 A | | 6/2018 | | |

* cited by examiner

ROBOT SYSTEM

TECHNICAL FIELD

The present invention relates a robot system.

BACKGROUND ART

Conventionally, a robot system has been known that performs a task using a robot having an arm capable of gripping a workpiece (for example, see Patent Document 1). The arm of the robot is provided with a camera for recognizing the workpiece. The robot system stores a three-dimensional shape of the workpiece in advance, recognizes the workpiece based on the three-dimensional shape recognized by the camera, and grips the workpiece with the arm.

In a robot system that machines a workpiece in cooperation with a machine tool, a robot performs a task of placing an unmachined workpiece on a table of the machine tool by gripping the workpiece with an arm and a task of taking out the machined workpiece from the table. The movement of the arm of the robot during the task is taught in advance by an operator. Since there are various obstacles which may interfere with the robot in a task zone of the robot, the operator should teach the movement of the arm such that the robot avoids interference with the obstacles.

Patent Document 1: Japanese Unexamined Patent Application, Publication No. 2007-319938

DISCLOSURE OF THE INVENTION

Problems to be Solved by the Invention

A technique for preventing a robot from interfering with obstacles has also been known. According to this technique, the obstacles are measured in advance with a three-dimensional sensor fixedly installed in a place different from the installation location of the robot, and three-dimensional point clouds of the obstacles are generated. In this case, the robot moves so as not to interfere with the obstacles by grasping the presence or absence of obstacles within a task range based on the three-dimensional point clouds.

However, there is a zone that cannot be measured by the fixedly installed three-dimensional sensor and data of such a zone is omitted. For example, a zone hidden behind an obstacle is not recognized by the fixedly installed three-dimensional sensor, and data thereof is omitted. For this reason, when an obstacle exists behind another obstacle, the arm of the robot may interfere with the obstacle during a task. In order to avoid the omission of data, it is also conceivable to install a plurality of three-dimensional sensors or perform measurement again while changing the position of the three-dimensional sensor. However, in such a case, it is necessary to perform calibration every time the three-dimensional sensor is installed, which is not practical. Therefore, there is a demand for a robot system capable of easily generating a three-dimensional point cloud of a measurement target, without omission of data.

Means for Solving the Problems

A robot system according to an aspect of the present disclosure includes: a robot having an arm; a three-dimensional sensor provided on the arm; and a three-dimensional point cloud generation unit configured to generate a three-dimensional point cloud of a measurement target, based on three-dimensional data of the measurement target measured by the three-dimensional sensor. The three-dimensional point cloud generation unit generates the three-dimensional point cloud of the measurement target by combining three-dimensional data of the measurement target, the three-dimensional data of the measurement target being measured in an arbitrary coordinate system within a task zone of the robot while changing a position of the three-dimensional sensor by movement of the arm.

Effects of the Invention

According to the aspect, it is possible to provide a robot system capable of easily generating a three-dimensional point cloud of a measurement target, without omission of data.

PREFERRED MODE FOR CARRYING OUT THE INVENTION

Embodiments of the present disclosure will be described below with reference to the drawings.

(Overview of Robot System)

Figure 1:
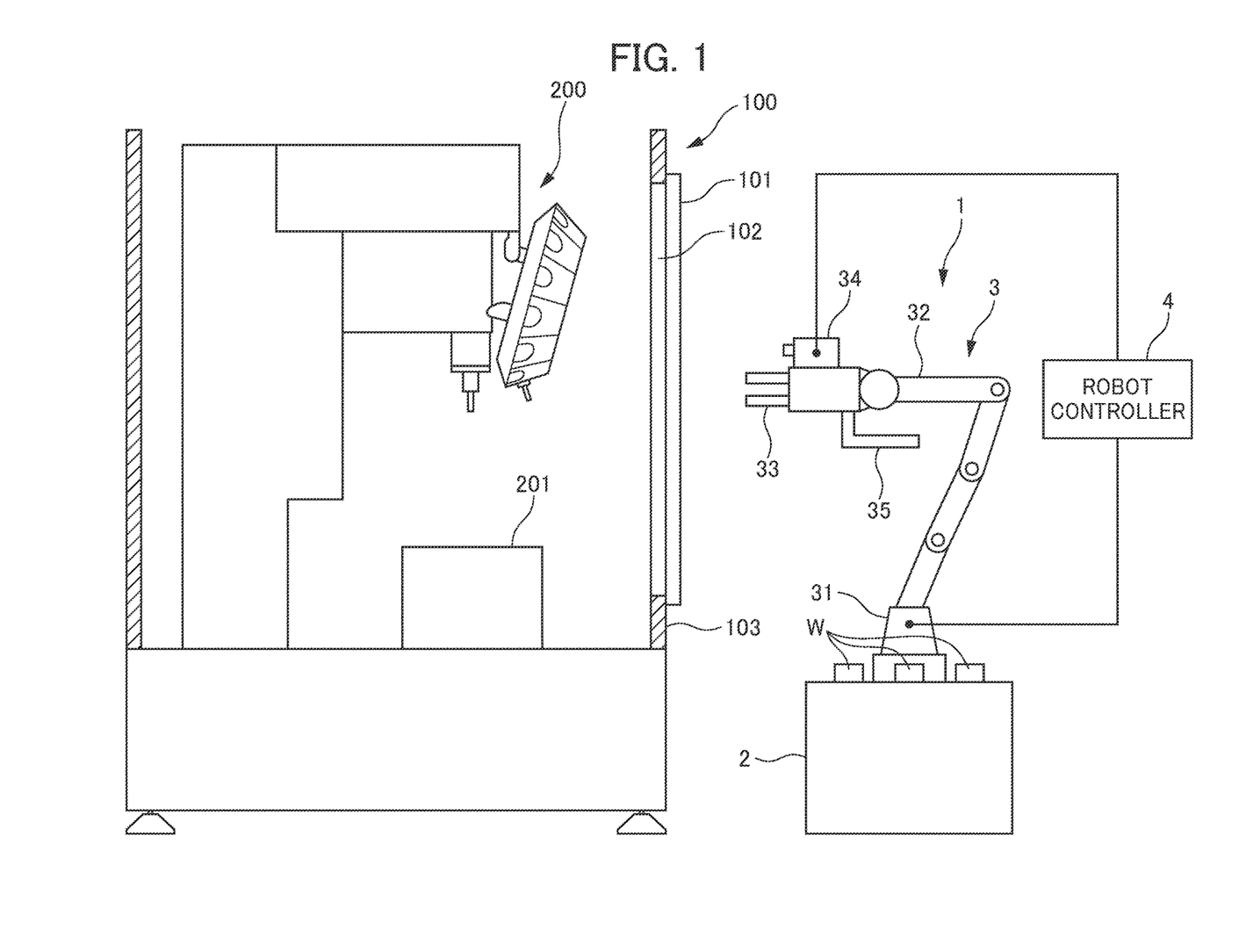
FIG. 1 is a perspective view showing a robot system.

A robot system 1 shown in FIG. 1 is installed in a vicinity of a machining room 100 in which workpieces are machined. The robot system 1 includes a robot 3 installed on a base 2 and a robot controller 4 that controls an operation of the robot 3. A plurality of workpieces W, which are task targets of the robot 3, are arranged on the base 2. Inside the machining room 100, a machine tool 200 is installed to perform predetermined machining on the workpiece W.

The robot 3 is an articulated robot and includes a body portion 31 that is fixed on the base 2, and an arm 32 that is provided at an upper part of the body portion 31 and is movable in any direction by means of a plurality of joints. At a distal end of the arm 32, a gripper 33 for gripping the workpiece W, a three-dimensional sensor 34 capable of photographing an external space, and a hand guide 35 for an operator to grip and manually move the arm 32 are provided.

The robot 3 includes a position detection sensor 36 (see FIG. 2) configured to detect position and posture of the robot 3. The position detection sensor 36 is constituted by, for example, angle sensors provided respectively to drive motors (not shown) corresponding to drive shafts of the joints of the arm 32. The position detection sensor 36 can acquire a rotation angle of each of the drive motors of the arm 32. Thus, the position and posture of the gripper 33 of the arm 32 of the robot 3 are detected.

The robot 3 moves the arm 32 along a motion path based on a robot motion program, through an opening 102 of the machining room 100 in which a door 101 is opened, and thus performs a motion of placing the unmachined workpiece W gripped with the gripper 33 on a table 201 of a machine tool 200 in the machining room 100. Further, the robot 3 performs a motion of taking out the machined workpiece W from the table 201 of the machine tool 200 by gripping the machined workpiece with the gripper 33. At this time, the arm 32 of the robot 3 is required to move so as not to interfere with an outer wall surface 103 including the door 101 of the machining room 100 and obstacles such as devices and components in the machining room 100.

The three-dimensional sensor 34 is constituted by, for example, a vision sensor. The three-dimensional sensor 34 captures images of measurement targets including the outer wall surface 103 of the machining room 100 existing in a task zone of the robot 3, the inside of the machining room 100, and the workpiece W, and acquires three-dimensional data of the measurement targets. Specifically, the three-dimensional sensor 34 measures three-dimensional data such as a distance distribution to the measurement targets, and outputs the measured three-dimensional data to the robot controller 4. The three-dimensional sensor 34 is attached to the distal end of the arm 32 alongside of the gripper 33 arm 32, and a relative position of the three-dimensional sensor 34 with respect to the arm 32 is defined in advance by calibration. For this reason, the position detection sensor 36 detects not only the position and posture of the gripper 33 of the arm 32 but also position and posture of the three-dimensional sensor 34.

(Robot System of First Embodiment)

Figure 2:
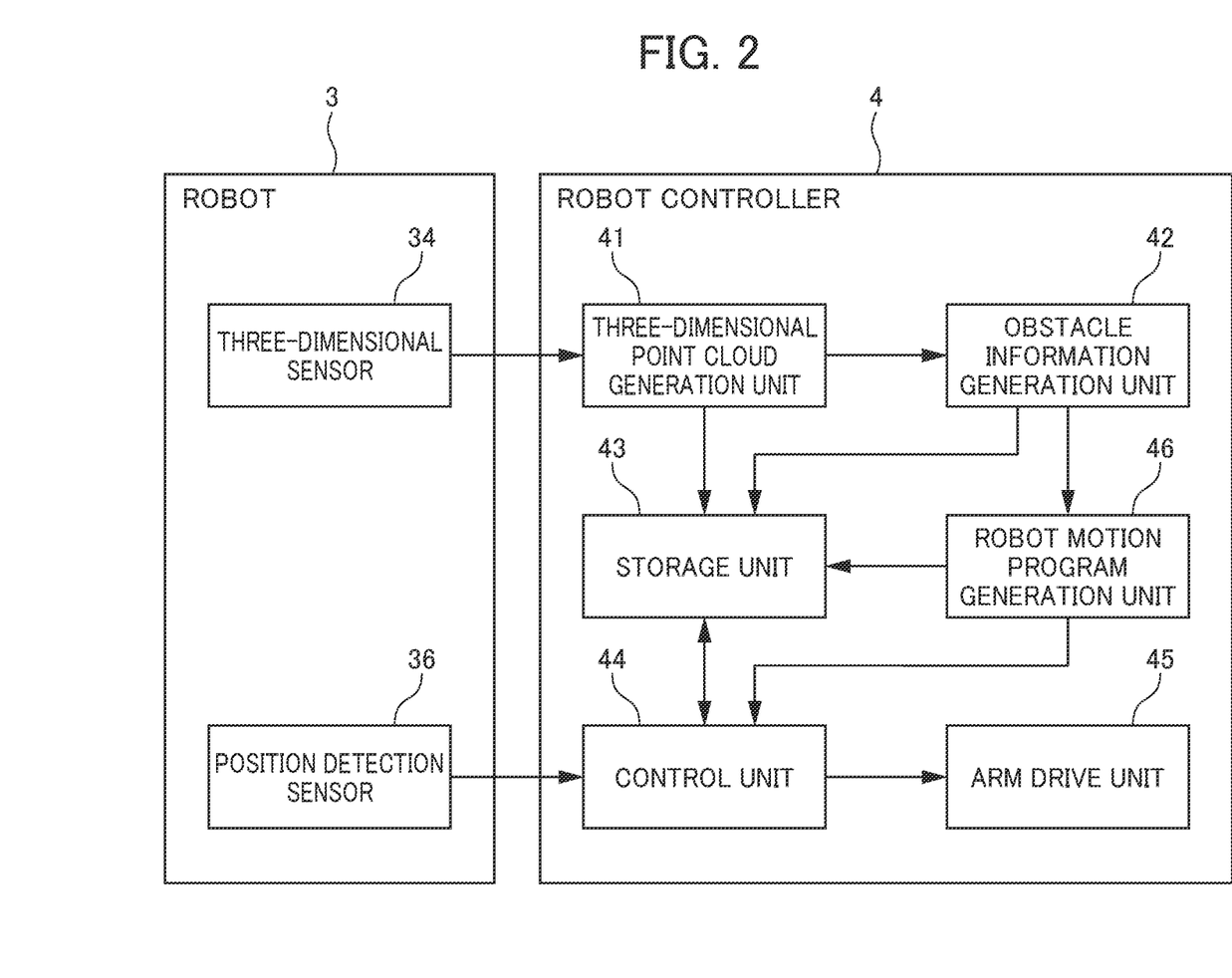
FIG. 2 is a block diagram showing a configuration of a robot system according to a first embodiment.

FIG. 2 shows a configuration of the robot system 1 according to a first embodiment. The robot controller 4 includes a three-dimensional point cloud generation unit 41, an obstacle information generation unit 42, a storage unit 43, a control unit 44, an arm drive unit 45, and a robot motion program generation unit 46.

The three-dimensional point cloud generation unit 41 generates and outputs a three-dimensional point cloud from the three-dimensional data measured by the three-dimensional sensor 34. The three-dimensional point cloud is a set of a plurality of points distributed on the surface of one or more objects (measurement targets) existing in a three-dimensional space. The three-dimensional point cloud generation unit 41 generates a three-dimensional point cloud of the measurement target by combining a plurality of pieces of three-dimensional data measured by the three-dimensional sensor 34, and outputs the generated three-dimensional point cloud to the obstacle information generation unit 42. In addition, when the measurement target is the workpiece W, the three-dimensional point cloud generation unit 41 outputs the measured three-dimensional point cloud of the workpiece W to the storage unit 43.

The obstacle information generation unit 42 generates obstacle information, based on the three-dimensional point cloud of the measurement target, which is an obstacle, generated by the three-dimensional point cloud generation unit 41. The obstacle information indicates a position of an obstacle that may interfere with the arm 32 moving in the task zone of the robot 3. Since a task range of the robot 3 (a range of motion of the arm 32) is defined in advance, the position of an obstacle that may interfere with the arm 32 can be identified in the three-dimensional point cloud. The obstacle information generated by the obstacle information generation unit 42 is sent to the storage unit 43 and is saved and registered therein.

The control unit 44 controls the arm drive unit 45 based on the position information of the arm 32 detected by the position detection sensor 36. By way of the control of arm drive unit 45 by the control unit 44, the arm 32 moves, and the gripper 33 grips the workpiece W.

The robot motion program generation unit 46 generates a motion program of the robot 3 to allow the robot 3 to perform a task on the workpiece W. The robot motion program includes information on the motion path of the robot 3 during a task. The motion path of the robot 3 is created based on the obstacle information generated by the obstacle information generation unit 42 described above. The robot motion program generated by the robot motion program generation unit 46 is sent to the storage unit 43 and is saved and registered therein.

Figure 3:
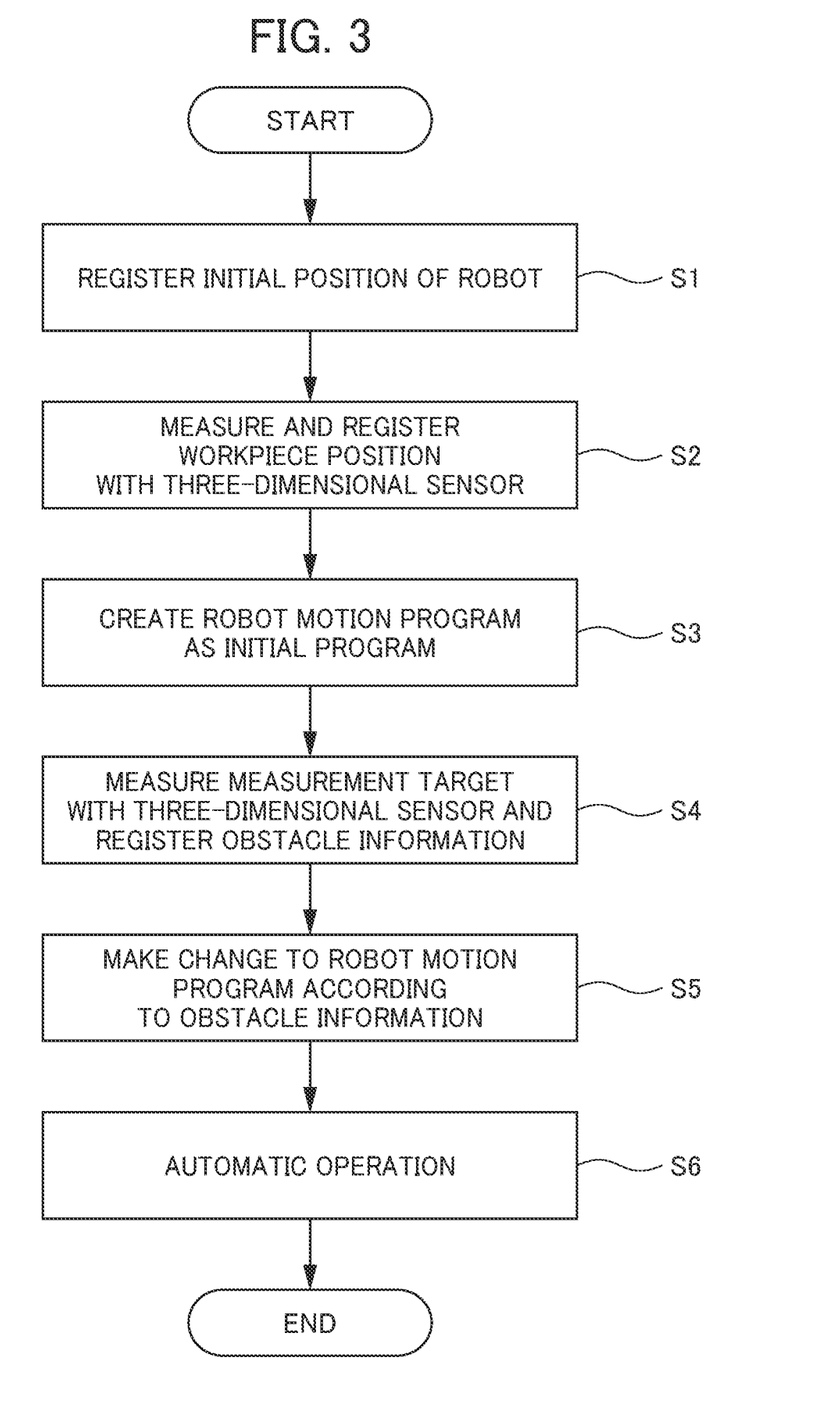
FIG. 3 is a flowchart for describing a process of generating a robot motion program in the robot system according to the first embodiment.

A process of generating the robot motion program for performing a task on the workpiece W in the robot system 1 will be described below with reference to a flowchart shown in FIG. 3. The process of generating the robot motion program is executed according to a predetermined process program stored in the robot controller 4 in advance.

First, the robot motion program generation unit 46 acquires and registers an initial position of the robot 3 (S1) The initial position of the robot 3 is acquired by the position detection sensor 36. Next, the robot motion program generation unit 46 controls the arm drive unit 45 via the control unit 44 to move the arm 32, and measures the workpiece W with the three-dimensional sensor 34. Thereby, the robot motion program generation unit 46 acquires and registers the workpiece W (S2). Thereafter, the robot motion program generation unit 46 creates a robot motion program as an initial program (S3).

The robot motion program as the initial program is a provisional motion program including a motion path of the robot 3 until the workpiece W is gripped by the arm 32 and placed on the table 201, for example. The robot motion program as the initial program does not necessarily reflect information on obstacles that may interfere with the arm 32. Therefore, the robot motion program generation unit 46 shifts a mode of the robot system 1 to an obstacle information generation mode, and acquires and registers the obstacle information (S4).

A specific process for acquiring the obstacle information in Step S4 will be further described with reference to a flowchart shown in FIG. 4. First, the measurement target as an obstacle is measured while the position of the three-dimensional sensor 34 is being changed with respect to the measurement target by movement of the arm 32, whereby three-dimensional data is acquired (S41). The measurement target is an object that may interfere with the arm 32 within the task range of the robot 3. Specifically, the measurement target includes the outer wall surface 103 of the machining room 100 and devices and components disposed inside the machining room 100.

Figure 5:
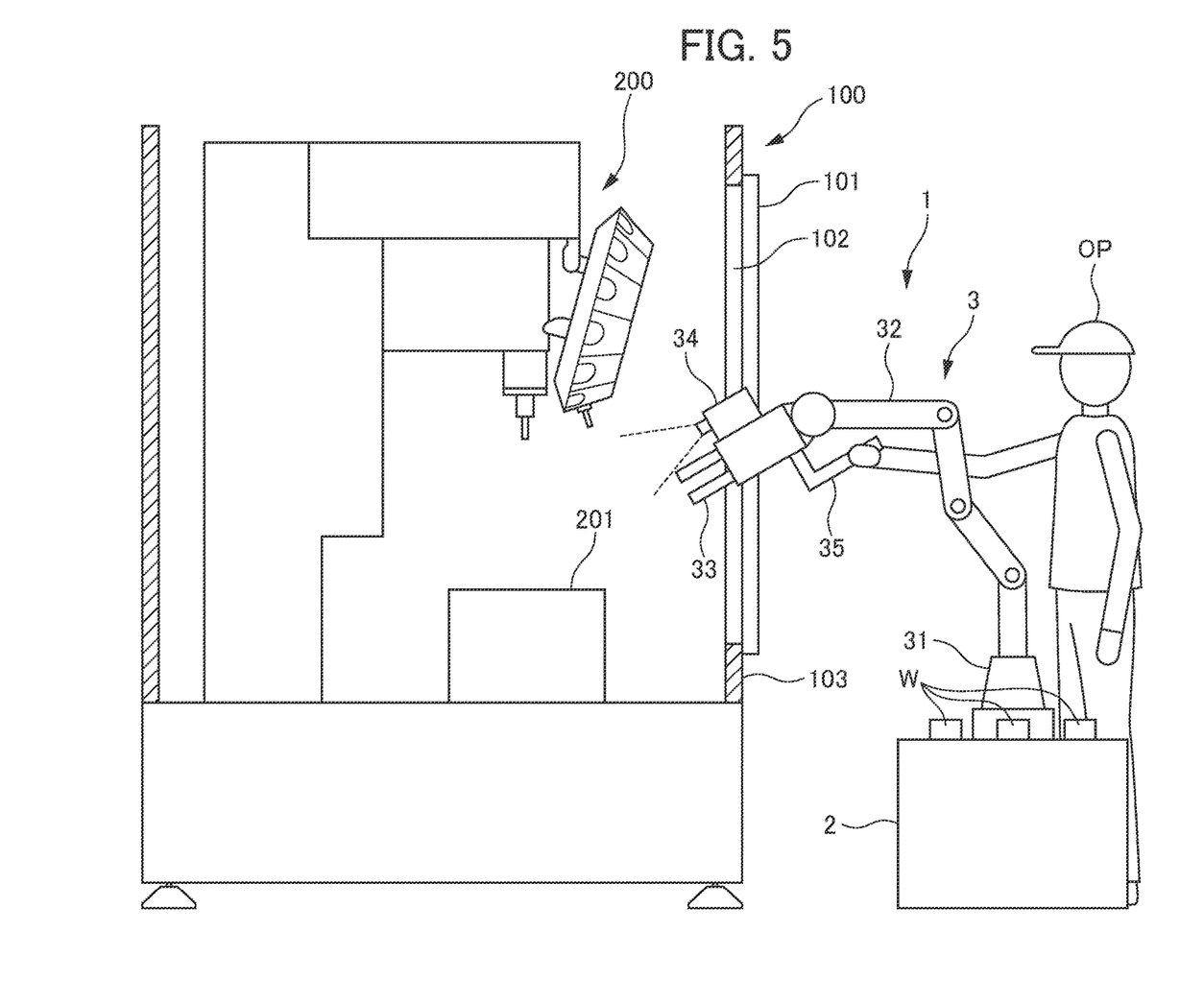
FIG. 5 is a diagram for describing an operation of generating the three-dimensional point cloud in the robot system according to the first embodiment.

In the present embodiment, when the three-dimensional sensor 34 measures the measurement targets, the arm 32 is manually moved by an operator OP as shown in FIG. 5. Specifically, the operator OP grips the hand guide 35 provided at the distal end of the arm 32 by hand, and directly moves the arm 32 by hand in an arbitrary coordinate system within the task range of the robot 3, while checking the presence or absence of an obstacle in the moving path of the arm 32.

Even in a case where hidden obstacles that cannot be seen from the robot 3 (for example, devices and components hidden behind the door 101 and the outer wall surface 103) exist within the task range of the robot 3, the obstacles can be reliably measured when the operator OP manually moves the arm 32 close to the obstacles as shown in FIG. 5.

In this way, the three-dimensional sensor 34 measures the measurement targets in an arbitrary coordinate system within the task range of the robot 3 while the operator OP manually moves the arm 32 to the measurement targets, whereby the three-dimensional sensor 34 acquires a plurality of pieces of three-dimensional data. The three-dimensional sensor 34 outputs the acquired plurality of pieces of three-dimensional data to the three-dimensional point cloud generation unit 41 of the robot controller 4.

The three-dimensional point cloud generation unit 41 combines the plurality of pieces of three-dimensional data acquired by the three-dimensional sensor 34, and generates a three-dimensional point cloud of the measurement target (S42). Data of the three-dimensional point cloud generated by the three-dimensional point cloud generation unit 41 is output to the obstacle information generation unit 42.

The obstacle information generation unit 42 generates obstacle information regarding the position information of the obstacle, which may interfere with the arm 32, based on the three-dimensional point cloud sent from the three-dimensional point cloud generation unit 41 (S43). The obstacle information generated by the obstacle information generation unit 42 is saved in the storage unit 43 (S44). Thus, the obstacle information generation mode ends.

After the robot motion program generation unit 46 acquires the obstacle information as described above, the process returns to the flow shown in FIG. 3 again. The robot motion program generation unit 46 makes a change to the robot motion program as the initial program, according to the obstacle information acquired in the obstacle information generation mode (S5). Thereby, the robot motion program generation unit 46 generates a robot motion program, based on the obstacle information. The robot motion program reflects all the obstacle information regarding the obstacles that may interfere with the arm 32 and includes the motion path of the robot 3 that allows the robot 3 to avoid interference with the obstacle. The generated robot motion program is sent to the storage unit 43 and is saved.

Thereafter, the robot system 1 automatically operates the robot 3 based on the robot motion program including the obstacle information regarding the obstacles that may interfere with the arm 32, and performs the task of gripping and transporting the workpiece W (36). Since the robot motion program for moving the robot 3 to be automatically operated includes the obstacle information constituted by the three-dimensional point cloud free from omission of data and including the information on the hidden obstacle that cannot be seen from the installation location of the robot 3, the interference of the arm 32 with the obstacle during the motion of the robot 3 is reduced or prevented.

The robot system 1 according to the first embodiment can exert the following effects. The three-dimensional point cloud generation unit 41 generates the three-dimensional point cloud of the measurement target by combining three-dimensional data of the measurement target, the three-dimensional data of the measurement target being measured in an arbitrary coordinate system within the task zone of the robot 3 while changing the position of the three-dimensional sensor 34 by the movement of the arm 32. This feature makes it possible to easily generate and acquire the three-dimensional point cloud of the measurement target, without omission of data.

The three-dimensional point cloud generation unit 41 generates the three-dimensional point cloud of the measurement target by combining three-dimensional data of the measurement target, the three-dimensional data of the measurement target being measured while the position of the three-dimensional sensor 34 being changed by the operator OP manually moving the arm 32. Therefore, the measurement targets can be measured from various points of view, and the obstacles existing in the task range of the robot 3 can be easily measured without omission of data, by the three-dimensional sensor 34.

The obstacle information acquired in this way remains unchanged even when the motion path of the robot 3 is changed depending on the change of the type of the workpiece W. Therefore, it is not necessary for three-dimensional sensor 34 to newly generate obstacle information or re-teach the moving path of the arm 32 every time the type of the workpiece W is changed.

The three-dimensional sensor 34 provided on the arm 32 also serves as a three-dimensional sensor for recognizing the workpiece W during a task. Therefore, it is not necessary to provide separate three-dimensional sensors for generating the obstacle information and recognizing the workpiece W, making it possible to construct the robot system 1 at a low cost.

The three-dimensional point cloud generation unit 41 is configured to generate the three-dimensional point cloud of the measurement target by combining three-dimensional data of the measurement target, the three-dimensional data of the measurement target being measured while the position of the three-dimensional sensor 34 being changed by the operator OP directly griping the hand guide 35 of the arm 32 and manually moving the arm 32. This feature makes it possible to easily generate the three-dimensional point cloud without omission of data. However, the three-dimensional point cloud generation unit 41 may be configured to generate the three-dimensional point cloud of the measurement target by combining three-dimensional data of the measurement target, the three-dimensional data of the measurement target being measured while the position of the three-dimensional sensor 34 being changed by the operator moving the arm 32 by way of a jog feed operation using a teach pendant.

(Robot System of Second Embodiment)

In the robot system 1 according to the first embodiment, when the three-dimensional sensor 34 measures the measurement targets, the operator OP manually moves the arm 32 while checking the presence or absence of the obstacles. However, a positional relationship between the obstacle within the task range of the robot 3 and the robot 3 may be generally fixed. In such a case, the robot system 1 may automatically move the arm 32 based on a predetermined motion program.

Figure 6:
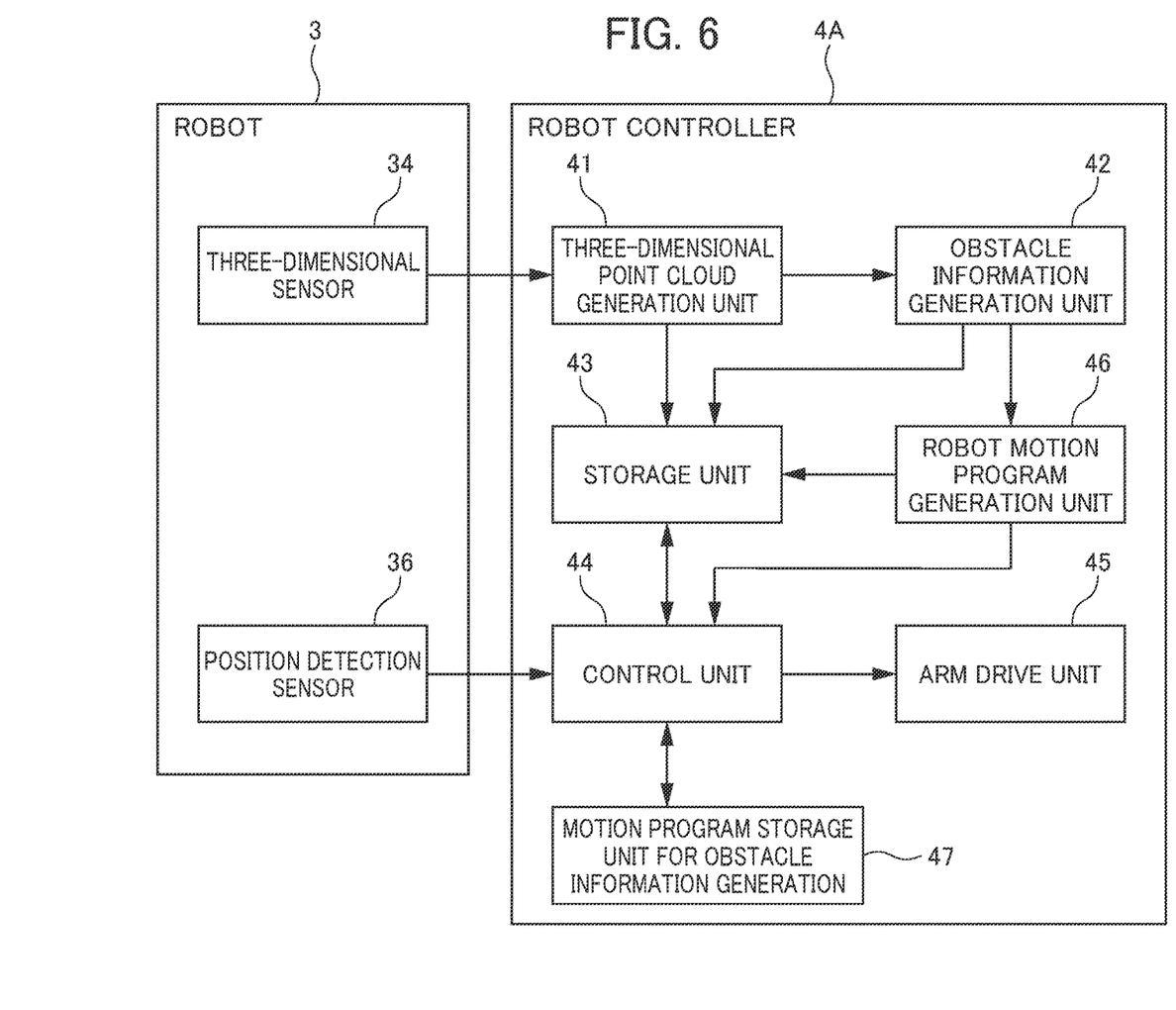
FIG. 6 is a block diagram showing a configuration of a robot system according to a second embodiment.

FIG. 6 shows a configuration of a robot system 1A according to a second embodiment. A robot controller 4A includes a motion program storage unit 47 for obstacle information generation, in addition to the components of the robot controller 4 shown in FIG. 2.

Figure 7:
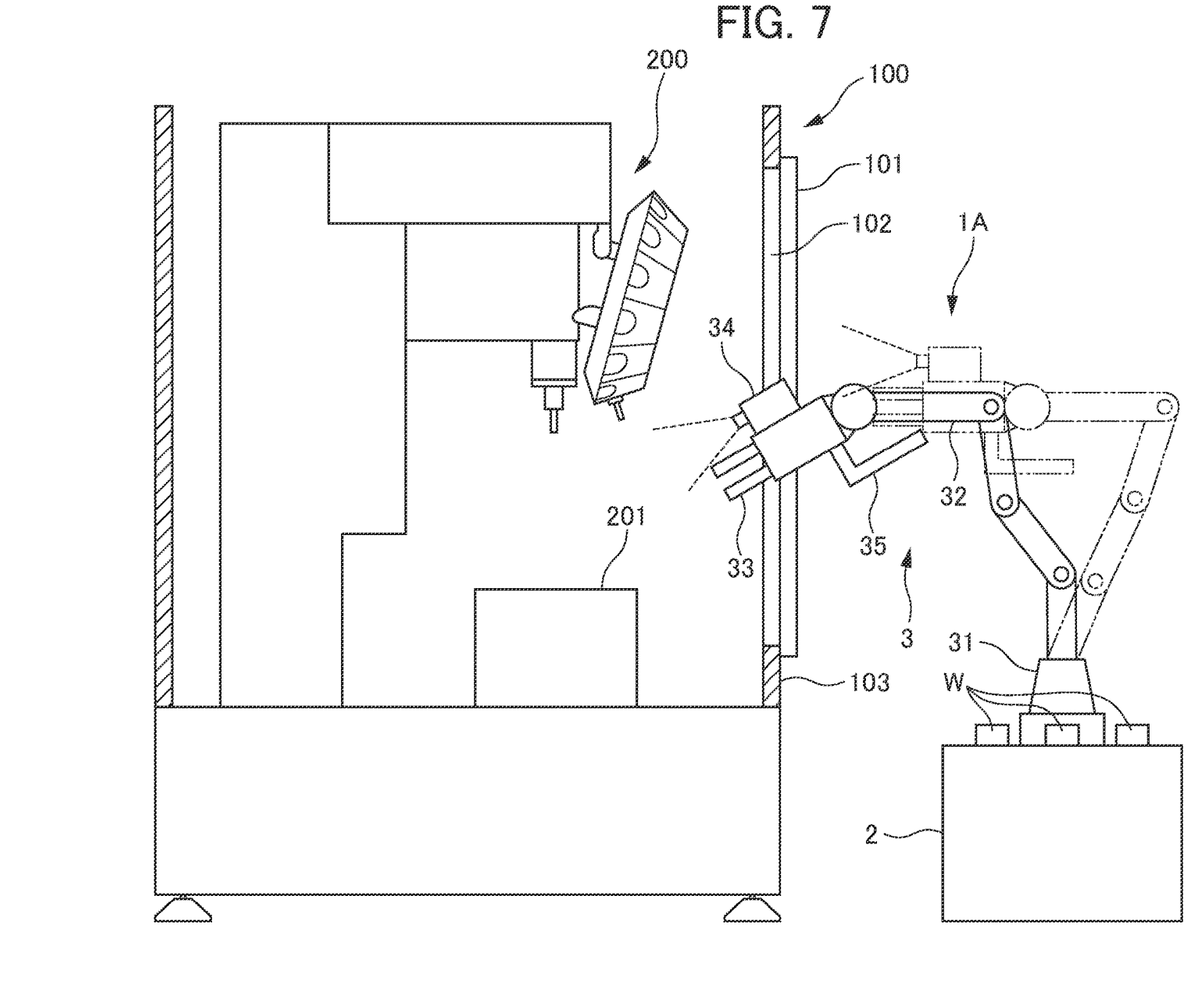
FIG. 7 is a diagram for describing an operation of generating a three-dimensional point cloud in the robot system according to the second embodiment.

The motion program storage unit 47 for obstacle information generation stores in advance a motion program for obstacle information generation for automatically moving the arm 32 during measurement of the measurement target using the three-dimensional sensor 34. The motion program for obstacle information generation includes a motion command that is directed to the robot 3 and is for moving the arm 32 within a range in which it is assumed that the known obstacle and the arm 32 do not interfere with each other. Therefore, as shown in FIG. 7, the robot motion program generation unit 46 of the robot controller 4A controls the arm drive unit 45 so as to automatically move the arm 32 based on the motion program for obstacle information generation during measurement of the measurement target using the three-dimensional sensor 34 in the obstacle information generation mode.

Figure 4:
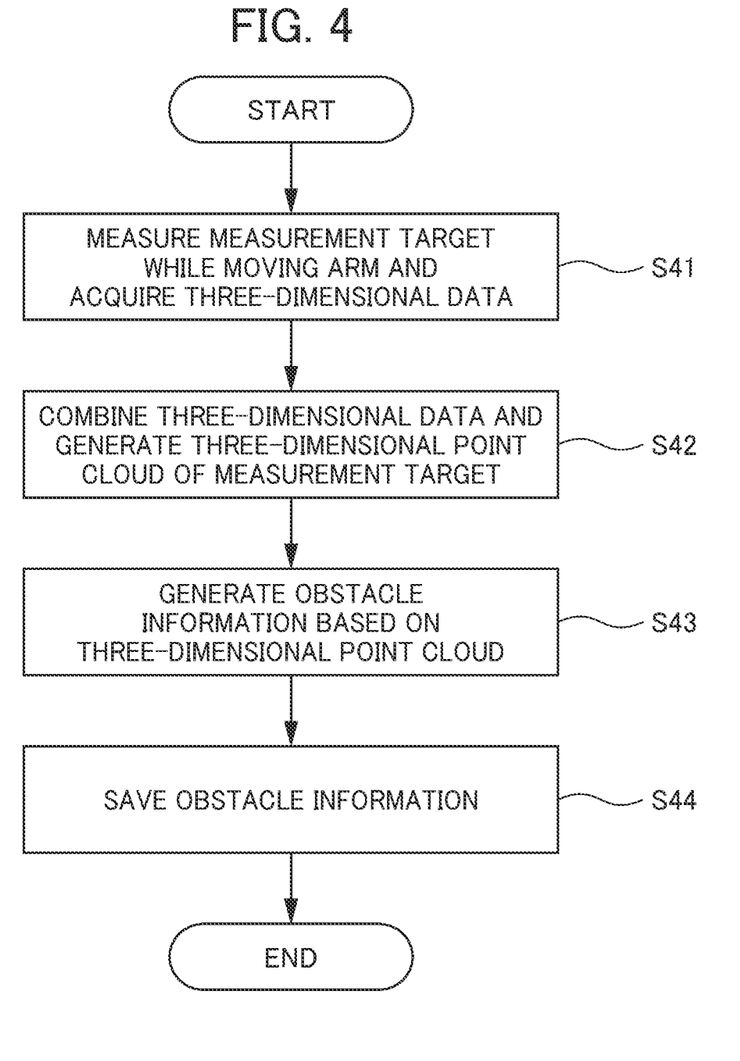
FIG. 4 is a flowchart for describing a process at the time of generating a three-dimensional point cloud in the robot system according to the first embodiment.

In the robot system 1 including the robot controller 4A, a specific operation for measuring the measurement target using the three-dimensional sensor 34 is executed according to the flowchart shown in FIG. 4. Specifically, in Step S41 in FIG. 4, the operator OP does not move the arm 32 by hand, but the robot motion program generation unit 46 reads the motion program for obstacle information generation from the motion program storage unit 47 for obstacle information generation. The robot motion program generation unit 46 controls the arm drive unit 45 via the control unit 44 based on the read motion program for obstacle information generation to automatically move the arm 32, and measures the measurement target with the three-dimensional sensor 34. Thus, three-dimensional data is acquired that is obtained by measuring obstacles existing in the task range of the robot 3 with the three-dimensional sensor 34. Subsequently, the same processes as in Steps S42 to S44 shown in FIG. 4 are executed.

Similarly to the robot system 1 according to the first embodiment, the robot system 1A also makes it possible to easily generate the three-dimensional point cloud of the measurement target, without omission of data. The feature in which the operator OP does not have to move the arm 32 by hand provides an advantage that obstacle information can be acquired more quickly and easily.

Figure 8:
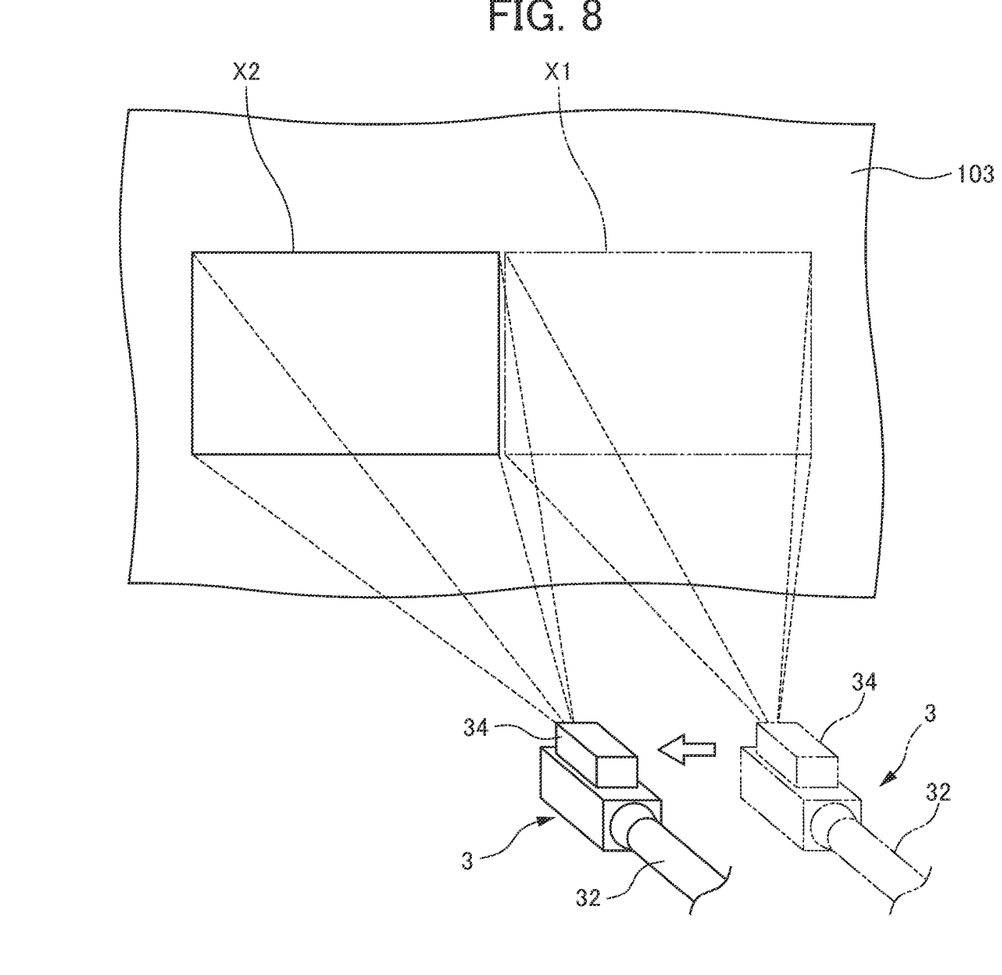
FIG. 8 is an explanatory diagram for describing measurement ranges of a three-dimensional sensor during measurement of a measurement target.

The motion program for obstacle information generation is preferably generated based on a measurement range of the three-dimensional sensor 34. Specifically, as shown in FIG. 8, the motion program for obstacle information generation causes the robot 3 to move such that a measurement range X1 of the three-dimensional sensor 34 before the movement of the arm 32 comes into contact with or partially overlaps with a measurement range X2 of the three-dimensional sensor 34 after the movement of the arm 32. FIG. 8 shows a case where the outer wall surface 103 of the machining room 100 is measured as a measurement target by the three-dimensional sensor 34. Thus, even when the arm 32 is automatically moved to measure the measurement target, the three-dimensional sensor 34 can measure the measurement target without omission of data.

The storage unit 43 may perform the function of the motion program storage unit 47 for obstacle information generation. The motion program for obstacle information generation may be loaded into the robot controller 4A from a storage device such as an external server when the measurement target is measured with the three-dimensional sensor 34. The robot controller 4A may include a changeover switch (not shown) for switching between an operation in which the arm 32 is manually moved by the operator OP and an operation in which the arm 32 is automatically moved based on the motion program for obstacle information generation when the measurement target is measured with the three-dimensional sensor 34, and allow the operator OP to select one of the operations.

In each of the above-described embodiments, the three-dimensional point cloud generation unit 41, the obstacle information generation unit 42, and the robot motion program generation unit 46 form part of the functions of the robot controller 4 or 4A, but the present invention is not limited the embodiments described above. At least one of the three-dimensional point cloud generation unit 41, the obstacle information generation unit 42, and the robot motion program generation unit 46 may be provided separately from the robot controller 4 or 4A. The arm drive unit 45 may be provided separately from the robot controller 4 or 4A. The motion program storage unit 47 for obstacle information generation may be provided separately from the robot controller 4 or 4A.

EXPLANATION OF REFERENCE NUMERALS 1, 1A: Robot system
3: Robot
32: Arm
34: Three-dimensional sensor
41: Three-dimensional point cloud generation unit
43: Obstacle information generation unit
46: Robot motion program generation unit
W: Workpiece

The invention claimed is:
1. A robot system comprising:
a robot having an arm;
a three-dimensional sensor provided on the arm;
a three-dimensional point cloud generation unit configured to generate a three-dimensional point cloud of a measurement target, based on three-dimensional data of the measurement target measured by the three-dimensional sensor;
an obstacle information generation unit configured to generate obstacle information based on the three-dimensional point cloud, the obstacle information indicating a position of an obstacle that may interfere with the arm when the arm moves; and
a robot motion program generation unit configured to generate a robot motion program based on the obstacle information, the robot motion program including a motion path for the robot to avoid interference with the obstacle, wherein
the three-dimensional point cloud generation unit generates the three-dimensional point cloud of the measurement target by combining three-dimensional data of the measurement target, the three-dimensional data of the measurement target being measured in an arbitrary coordinate system within a task zone of the robot while a position of the three-dimensional sensor is being changed by an operator gripping and directly moving the arm, and
the robot motion program generation unit generates, before the arm moves in order to perform a task, the robot motion program based on the three-dimensional data and stores the robot motion program in a storage unit.
2. The robot system according to claim 1, wherein
the three-dimensional sensor also serves as a three-dimensional sensor that recognizes a workpiece.

* * * * *